United States Patent
Westermann

(10) Patent No.: US 11,942,274 B2
(45) Date of Patent: Mar. 26, 2024

(54) FILM CAPACITOR FOR POWER ELECTRONICS

(71) Applicant: Wolfgang Westermann, Mannheim (DE)

(72) Inventor: Axel Westermann, Berlin (DE)

(73) Assignee: Wolfgang Westermann, Mannheim (DE)

( * ) Notice: Subject to any disclaimer, the term of this patent is extended or adjusted under 35 U.S.C. 154(b) by 115 days.

(21) Appl. No.: 17/638,791

(22) PCT Filed: Aug. 19, 2020

(86) PCT No.: PCT/EP2020/073178
§ 371 (c)(1),
(2) Date: Feb. 25, 2022

(87) PCT Pub. No.: WO2021/037626
PCT Pub. Date: Mar. 4, 2021

(65) Prior Publication Data
US 2022/0293341 A1 Sep. 15, 2022

(30) Foreign Application Priority Data

Aug. 26, 2019 (DE) ...................... 10 2019 212 777.0
Nov. 21, 2019 (DE) ...................... 10 2019 217 976.2

(51) Int. Cl.
*H01G 2/10* (2006.01)
*H01G 4/232* (2006.01)
(Continued)

(52) U.S. Cl.
CPC ............. *H01G 2/106* (2013.01); *H01G 4/232* (2013.01); *H01G 4/32* (2013.01); *H01G 4/38* (2013.01)

(58) Field of Classification Search
None
See application file for complete search history.

(56) References Cited

U.S. PATENT DOCUMENTS

| 1,821,803 | A |   | 9/1931 | Haefely |
| 3,150,300 | A | * | 9/1964 | Schils ...................... H01G 4/32 361/308.2 |

(Continued)

FOREIGN PATENT DOCUMENTS

| DE | 2624724 A1 | 12/1977 |
| DE | 102013216941 A1 | 2/2015 |

(Continued)

OTHER PUBLICATIONS

International Search Report and Written Opinion and International Preliminary Report on Patentability issued in International Application No. PCT/EP2020/073178, dated Mar. 1, 2022, with English translation, 17 pages.

*Primary Examiner* — Eric W Thomas
(74) *Attorney, Agent, or Firm* — Kowert, Hood, Munyon, Rankin & Goetzel, P.C.

(57) ABSTRACT

The invention relates to a film capacitor for power electronics, which comprises a first electrically conductive layer, which is arranged on a first end side face of the film capacitor, wherein the surface normal of the first electrically conductive layer is perpendicular to the surface normals of dielectric films of the film capacitor. A second electrically conductive layer is arranged on a second end side face opposite from the first end side face, wherein the surface normal of the second electrically conductive layer is perpendicular to the surface normals of the dielectric films of the film capacitor. The film capacitor has at least one inner passage, which extends from the first electrically conductive layer to the second electrically conductive layer, wherein the passage is formed by removal of capacitor material. The invention also relates to a capacitor assembly.

20 Claims, 13 Drawing Sheets

(51) Int. Cl.
 *H01G 4/32* (2006.01)
 *H01G 4/38* (2006.01)

(56) References Cited

U.S. PATENT DOCUMENTS

| | | | | |
|---|---|---|---|---|
| 4,547,832 A | * | 10/1985 | Lavene | H01G 4/228 |
| | | | | 29/25.42 |
| 4,959,652 A | * | 9/1990 | Hirama | H01G 4/2325 |
| | | | | 29/25.42 |
| 7,002,789 B1 | * | 2/2006 | Georgopoulos | H01G 4/38 |
| | | | | 29/25.42 |

FOREIGN PATENT DOCUMENTS

| | | | |
|---|---|---|---|
| DE | 102017215419 A1 | | 3/2019 |
| EP | 3477669 A1 | | 5/2019 |
| JP | 11074150 A | * | 3/1999 |
| JP | 2011210863 A | | 10/2011 |

\* cited by examiner

FILM CAPACITOR FOR POWER ELECTRONICS

PRIORITY CLAIM

This application is a U.S. National Stage filing of International Application No. PCT/EP2020/073178, filed Aug. 19, 2020, titled "FILM CAPACITOR FOR POWER ELECTRONICS", which claims the benefit of priority to the German Application No. 102019 212777.0, filed Aug. 26, 2019, and German Application No. 102019217976.2, filed Nov. 21, 2019. All of the aforementioned applications are incorporated herein by reference in their entireties.

FIELD OF THE INVENTION

The present invention relates to a film capacitor for power electronics, and to a capacitor assembly consisting of one or more film capacitors, the one or more film capacitors being electrically contacted and interconnected by means of connection elements, and to a method for producing a film capacitor of this kind.

DESCRIPTION OF THE RELATED ART

Film capacitors are increasingly used, in particular in the field of power electronics. Thus, the application of film capacitors comprises inter alia for example the use as intermediate circuit capacitors or DC link capacitors, or for example the use for eliminating or damping voltage peaks, which result for example when switching power semiconductors, such as inter alia IGBTs. Compared with other capacitor types, such as electrolyte capacitors, film capacitors exhibit various advantages, such as an increased service life, an improved temperature stability, and reliability, on account of their self-healing properties. However, parasitic inductances and resistances constitute an existing problem in film capacitors, and have a disadvantageous effect in the case of high switching frequencies, in the field of power electronics. Improvements in the field of film capacitor design are therefore desirable.

SUMMARY OF THE EMBODIMENTS

It is desirable for the manufacturers of film capacitors to reduce or eliminate the parasitic resistances and inductances, as far as possible. Parasitic resistances may be minimized easily and effectively, at reasonable costs, for example by short and thick connectors or by collecting bars. In contrast, an effective reduction or minimization of the parasitic inductances is more complex and laborious, since corresponding external cabling may be utilized such that the current flows are oriented such that the magnetic fields, generated by the current flows, are largely compensated. Said cabling through connection elements takes place, on account of the geometry, around the individual capacitors or the capacitor assembly, both the polarity of individual capacitors in the case of a capacitor unit, and the polarity of the connection elements that are isolated from one another, for example collecting bars (known as busbars), being varied.

EP 3 477 669 A1 discloses a film capacitor in the form of a round winding, which comprises a special rigid winding core which is internally hollow. In this case, an at least partial compensation of the magnetic fields, which are generated by alternating currents in the coatings of the capacitor, is achieved by means of a supply cable of opposite polarity, which extends inside the capacitor, through the interior of the rigid winding core. However, a capacitor of this kind is complex and costly to manufacture, on account of the use of the special rigid winding core and the construction thereof. The outer form of the capacitor is also restricted to the form of a round winding on account of the use of the winding core, which has a negative impact on the packing density thereof as a component of a capacitor assembly, compared with other designs, such as flat-wound and rectangular stacked capacitors.

In general, flat-wound capacitors are preferred as a component of a capacitor assembly. In the case of packing of round-wound capacitors in a capacitor assembly, on account of the circular base surface of the round-wound capacitors unused cavities result, because round-wound capacitors arranged side-by-side touch one another only along one line. In contrast thereto, however, on account of their design, flat-wound capacitors allow for a space-efficient mode of packing in an assembly, because individual capacitors can be packed more tightly, and unused cavities can be reduced. However, a conventional flat-wound capacitor does not comprise any openings or feed-throughs suitable for the cabling, such that disadvantageous, geometry-based cabling around the flat-wound capacitor may not be avoided. This limitation results from the manufacturing process of the flat-wound capacitors, which provides, in a first step, for dielectric films to be wound around a winding mandrel, as a result of which initially a round winding is obtained. Subsequently, the winding mandrel can be removed from the center of the round winding, or the winding resulting from winding the dielectric films can be removed from the winding mandrel. When a flexible core tube is used as the winding core, the core tube can also remain in the center of the round winding. The round winding is subsequently deformed or pressed flat, under pressure. In this case, any opening, which either results by removing the winding core or is formed by the flexible core tube, is completely pressed together and closed by the deformation step, such that subsequently there is no longer any opening present for cabling.

An object of the present invention is therefore that of reducing parasitic inductances in film capacitors, in particular flat-wound capacitors, in a cost-efficient and simple manner, without accepting structural complexity and the disadvantage of a low packing density, as in the case of round-wound capacitors. Accordingly, the object of the present invention is also that of providing capacitor assemblies made up of film capacitors, in which the inductances losses and heat losses are kept small.

This object is achieved by the independent claims. Advantageous embodiments are defined in the dependent claims.

A film capacitor according to the invention comprises a first electrically conductive layer, which is arranged on a first end side face of the film capacitor, the surface normal of the first electrically conductive layer being perpendicular to the surface normals of the dielectric films of the film capacitor, and a second electrically conductive layer, which is arranged on a second end side face opposite the first end side face, the surface normal of the second electrically conductive layer being perpendicular to the surface normals of the dielectric films of the film capacitor, the film capacitor comprising at least one inner passage which extends from the first electrically conductive layer to the second electrically conductive layer, the passage being formed by removal of capacitor material.

Contrary to common knowledge and common practice, a passage of this kind, which is formed by removal of capacitor material, for example parts of the dielectric films of the film capacitor and (if present) parts of a flexible core tube, which served as a winding core, does not lead to disadvantageous effects on the capacitor. Thus, the capacitor according to the invention is neither destroyed nor does it suffer losses of quality. All that could be identified was a reduction in the capacitance of a few percent of the original capacitance. However, this slightly disadvantageous effect can be compensated by an addition of capacitance by more film material during manufacture. A passage of this kind through the film capacitor allows for the use of a connecting line which extends through the passage, in order to contact the first or second electrically conductive layer of the capacitor. In this way, routings are avoided which are arranged on the outside, around the capacitor. This leads on the one hand to a saving of line material, but on the other hand in particular also to a significant reduction in parasitic inductances.

According to an advantageous embodiment, the film capacitor according to the invention can be a flat-wound or a stacked capacitor, which leads to the corresponding advantages in the case of the packing density in capacitor assemblies.

According to a further advantageous embodiment, the passage may be a drilled hole, and can thus be easily made, after the actual film capacitor has been manufactured in a conventional manner.

According to a further advantageous embodiment, the passage can extend in a substantially perpendicular direction, with respect to the end faces of the film capacitor. Furthermore, the passage can be positioned in various regions and can be differently dimensioned. This allows for an adjustment of the passage to corresponding specifications for, inter alia, the dimensioning of the connecting line.

According to a further advantageous embodiment, the electrically conductive layers can be designed as schoopage layers. The electrically conductive layers allow for electrical contacting of the film capacitor according to the invention.

According to a further advantageous embodiment, the dielectric films of the film capacitor may comprise plastics films consisting for example of polyester (PET), polyethylene naphthalate (PEN), polyphenylene sulfide (PPS), polypropylene (PP), polytetrafluoroethylene (PTFE), polystyrene (PS), polycarbonate (PC), or similar plastics materials. All materials suitable for a film capacitor are conceivable here. The dielectric film can be metallized entirely or in part, or not at all.

In an advantageous manner, a capacitor assembly may comprise a film capacitor according to the invention, an electrically conductive connection being guided from the first or the second electrically conductive layer on one end side face of the film capacitor, through the passage, to the other end side face, respectively, of the film capacitor.

In the case of a capacitor assembly of this kind it is advantageously possible for a first connection element to be connected to the first or the second electrically conductive layer of the film capacitor, a second connection element being connected to the other electrically conductive layer, in each case, via the electrically conductive connection which is conducted through the passage. The first and the second connection element are arranged so as to be electrically isolated from one another, side-by-side or one above the other, on the end side face of the film capacitor which is opposite the electrically conductive layer that is connected to the electrically conductive connection. As a result, all the connection elements can be arranged on just one end face of the film capacitor.

A capacitor assembly of this kind is advantageous in several ways. Since the first connection element and the second connection element, having opposing polarities in each case, are arranged on the same end face of the film capacitor (or the same end faces of a plurality of film capacitors) in an isolated manner and close beside one another, the magnetic fields generated in the connection elements virtually compensate one another. At the same time, parasitic inductances are reduced in that no L-shaped or U-shaped or loop-like connection elements (without an antipole) having a polarity are used for contacting the one or more film capacitors. Furthermore, it is likewise not necessary to arrange two connection elements, in each case, of opposing polarities, on each end face for each conductive layer, in order that the parasitic inductances of the connection elements, on each end face, compensate one another. Therefore, the capacitor assembly according to the invention can be manufactured in a more compact and cost-efficient manner. Since the connection elements cover the one or more film capacitors on just one side, the capacitor assembly can be cooled significantly more efficiently and more uniformly, since the majority of the cabling is provided on just one side, and an increased number of connection elements for integral cooling is possible.

A plurality of such capacitor assemblies can advantageously be contacted with one another, in series or in parallel, by means of a plurality of connection elements, all the connection elements being arranged so as to be electrically isolated from one another, side-by-side or one above the other on the end side faces of the film capacitors of the capacitor assemblies which are opposite the electrically conductive layers of the film capacitors that are contacted by the electrically conductive connections.

A further capacitor assembly according to the invention comprises a plurality of capacitor assemblies made up of individual film capacitors according to the invention which are arranged side-by-side, a first connection element being connected to the first electrically conductive layer and/or the second electrically conductive layer of the film capacitors of the capacitor assemblies, in each case, and a second connection element being connected to the first electrically conductive layer and/or the second electrically conductive layer of the film capacitors of the capacitor assemblies, in each case, which are in each case of an opposing polarity with respect to the first and second electrically conductive layers that are connected to the first connection element. The first and the second connection element are arranged so as to be electrically isolated from one another, side-by-side or one above the other, on the same end side face of the film capacitor which is opposite the electrically conductive layer that is connected to the electrically conductive connection, the connection of the first and second connection element to the respective first and second electrically conductive layers in each case being achieved either directly or via an electrically conductive connection which is guided through a passage of the relevant film capacitor.

According to a preferred embodiment, a further layer of capacitor assemblies, arranged side-by-side, can be arranged over a capacitor assembly consisting of capacitor assemblies arranged side-by-side, the first and second electrically conductive layers of which in each case correspondingly contact the first connection element and the second connection element of the capacitor assembly located there-below, in order to form a parallel connection of the film capacitors.

In a further advantageous embodiment, a capacitor assembly comprises a plurality of capacitor subassemblies, the capacitor subassemblies each comprising a capacitor assembly having a single film capacitor or a capacitor assembly having a plurality of film capacitors connected in parallel, the capacitor subassemblies being connected in series by means of a third connection element, the first, the second, and the third connection element being arranged, in a manner electrically isolated from one another, side-by-side or one above the other, on the same end side face of the film capacitor, which is opposite the electrically conductive layer that is connected to the electrically conductive connection.

A method for manufacturing the film capacitor according to the invention comprises a step for producing the passage in the case of a film capacitor manufactured by known methods, in the case of which capacitor material is removed.

In this case, the step of producing the passage takes place only after the production of the relevant design. Thus, in a first manufacturing step, the capacitor of the design desired in each case can be produced in the conventional manner. After the capacitor has been manufactured in the desired respective design, the passage can subsequently be made.

According to an advantageous embodiment, the step for producing the passage can comprise a drilling procedure using a cutting drill. Alternatively, any other suitable process for removing capacitor material or parts of the dielectric film can also be used.

According to a further advantageous embodiment it is possible, for example, for the advancement of the cutting drill to be performed continuously or in an oscillating manner. This means that the drilling procedure can be performed in a manner having a continuous advancement and/or in a manner having a repeated intermittent advancement reversal.

A further preferred capacitor assembly for parallel interconnection of subassemblies comprises a first subassembly comprising at least one film capacitor which comprises a first electrically conductive layer, which is arranged on a first end side face of the film capacitor, the surface normal of the first electrically conductive layer being perpendicular to the surface normals of the films of the film capacitor, and a second electrically conductive layer, which is arranged on a second end side face of the film capacitor, opposite the first end side face, in parallel with the first electrically conductive layer. A first connection element in each case contacts the first electrically conductive layer of the at least one film capacitor of the first subassembly. A second subassembly arranged above the first subassembly comprises at least one film capacitor comprising a first electrically conductive layer, which is arranged on a first end side face of the film capacitor, the surface normal of the first electrically conductive layer being perpendicular to the surface normals of the films of the film capacitor, and a second electrically conductive layer, which is arranged on a second end side face of the film capacitor, opposite the first end side face, in parallel with the first electrically conductive layer. A second connection element in each case contacts the second electrically conductive layer of the at least one film capacitor of the second subassembly. The first connection element in each case contacts the first electrically conductive layer of the at least one film capacitor of the second subassembly via at least one first connecting line, and the second connection element in each case contacts the second electrically conductive layer of the at least one film capacitor of the first subassembly via at least one second connecting line.

An advantage of such a capacitor assembly comprising two capacitor courses that are arranged one above the other and consist of film capacitor, each being of half a winding height h/2 compared with a single course of large film capacitors of a winding height h is that of a greatly reduced low inductance and lower thermal losses generated during operation.

The at least one film capacitor of the first and second subassembly preferably in each case comprises at least one inner passage which extends from the first electrically conductive layer, in each case, to the second electrically conductive layer, in each case, and the at least one first connecting line and the at least one second connecting line extends through the respective inner passage.

The first connection element and/or the second connection element are preferably arranged at least in part between the first subassembly and the second subassembly.

In the case of the described capacitor assembly, the first connection element preferably comprises recesses for conducting through the at least one second connecting line of the second connection element, and the second connection element comprises recesses for conducting through the at least one first connecting line of the first connection element.

A further preferred capacitor assembly for series interconnection of subassemblies comprises a first subassembly comprising at least one film capacitor which comprises a first electrically conductive layer, which is arranged on a first end side face of the film capacitor, the surface normal of the first electrically conductive layer being perpendicular to the surface normals of the films of the film capacitor, and a second electrically conductive layer, which is arranged on a second end side face of the film capacitor, opposite the first end side face, in parallel with the first electrically conductive layer. A first connection element in each case contacts the first electrically conductive layer of the at least one film capacitor of the first subassembly. A second subassembly arranged above the first subassembly comprises at least one film capacitor comprising a first electrically conductive layer, which is arranged on a first end side face of the film capacitor, the surface normal of the first electrically conductive layer being perpendicular to the surface normals of the films of the film capacitor, and a second electrically conductive layer, which is arranged on a second end side face of the film capacitor, opposite the first end side face, in parallel with the first electrically conductive layer. A second connection element in each case contacts the second electrically conductive layer of the at least one film capacitor of the second subassembly. A third connection element comprises at least one first connection line and at least one second connection line, the at least one first connecting line of the third connection element contacting the second electrically conductive layer, in each case, of the at least one film capacitor of the first subassembly, and the at least one second connecting line of the third connection element contacting the first electrically conductive layer, in each case, of the at least one film capacitor of the second subassembly.

An advantage of such a capacitor assembly comprising two capacitor courses that are arranged one above the other and consist of film capacitor, each being of half a winding height h/2 compared with a single course of large film capacitors of a winding height h is that of a greatly reduced low inductance and lower thermal losses generated during operation.

The at least one film capacitor of the first and second subassembly can preferably in each case comprise at least one inner passage which extends from the first electrically conductive layer, in each case, to the second electrically conductive layer, in each case, and the at least one first connecting line of the third connection element, and the at least one second connecting line of the third connection element, extend through the respective inner passage of the film capacitor.

The first connection element and/or the second connection element and/or the third connection element are preferably arranged at least in part between the first subassembly and the second subassembly.

Further preferably, the first connection element comprises recesses for conducting through the at least one first connecting line of the third connection element, and the second connection element comprises recesses for conducting through the at least one second connecting line of the third connection element.

Advantageously, the connection elements can in each case be designed as conductors, wires, flat wires, gratings, joint plates or busbars.

BRIEF DESCRIPTION OF THE DRAWINGS

Further details, features and advantages of the invention can be found in the following description and the figures, in which.

In the figures, identical or functionally identical components are provided with the same reference signs.

DETAILED DESCRIPTION

Figures 1A, 1B:
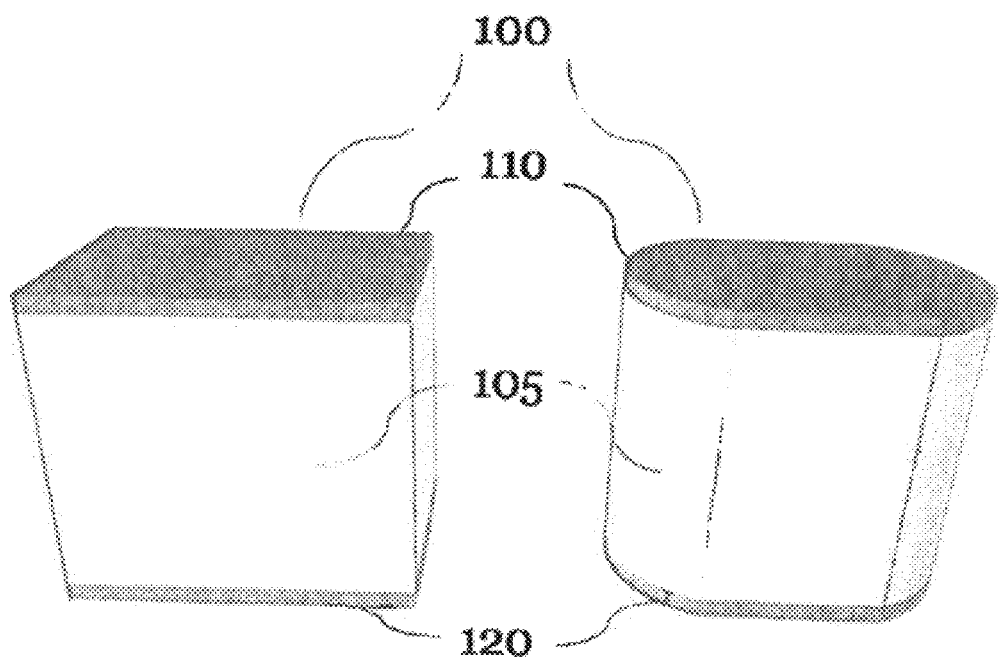
FIG. 1A is an oblique view, by way of example, of a film capacitor according to the prior art, which is designed in the form of a stacked capacitor.
FIG. 1B is an oblique view, by way of example, of a film capacitor according to the prior art, which is designed in the form of a flat winding.

FIG. 1A is an oblique view, by way of example, of a film capacitor 100 of the prior art, which is designed in the form of a stacked capacitor. The capacitor 100 shown comprises dielectric films 105 which are arranged in layers one above the other. The stacked capacitor, thus resulting, comprises a first and second end side face in each case, on the surfaces of which a first electrically conductive layer 110 and a second electrically conductive layer 120 are arranged, correspondingly, in each case. In this case, the electrically conductive layers are arranged such that the surface normals thereof are perpendicular to the surface normals of the dielectric films of the capacitor which are arranged in layers one above the other. The electrically conductive layers serve as a contact surface for electrical contacting of the capacitor. The electrically conductive layers can also be designed as schoopage layers.

FIG. 1B is an oblique view, by way of example, of a film capacitor 100 of the prior art, which is designed in the form of a flat-wound capacitor. The capacitor 100 comprises dielectric films 105. These are wound around a winding mandrel, during manufacture, such that a film capacitor in the form of a round-wound capacitor results. In order to achieve the form of a flat-wound capacitor, the winding mandrel is subsequently removed or the winding resulting from winding the dielectric films 105 is removed from the winding mandrel, and subsequently the winding is flattened under the action of pressure and brought into the shape of an oval, such that the form of a flat-wound capacitor, shown in FIG. 1B, is created from the form of a round-wound capacitor. In this case, the cavity previously occupied by the winding core disappears completely due to the deformation under the action of pressure. The film capacitor, thus resulting, comprises a first and second end side face in each case, on the surfaces of which a first electrically conductive layer 110 and a second electrically conductive layer 120 are applied, correspondingly, in each case. In this case, the electrically conductive layers are arranged such that the surface normals thereof are perpendicular to the surface normals of the wound dielectric films of the capacitor. The electrically conductive layers serve as a contact surface for electrical contacting of the capacitor. The electrically conductive layers can be designed as schoopage layers.

Figure 2A:
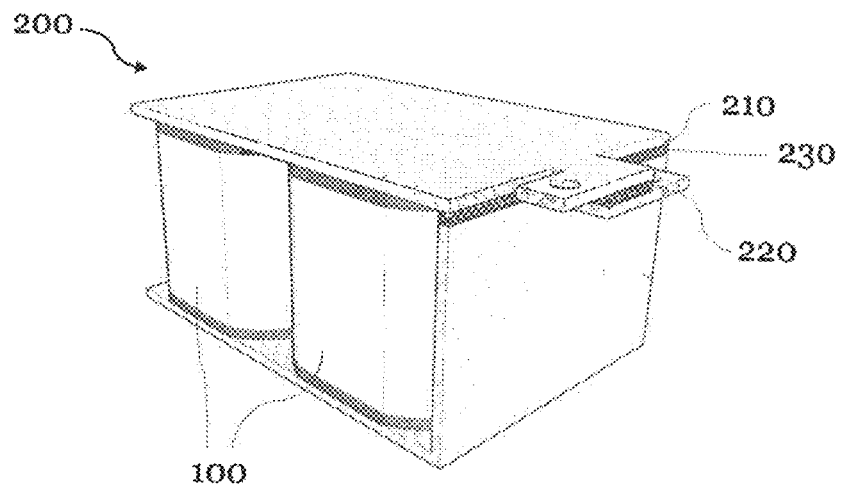
FIG. 2A is a perspective view, by way of example, of a capacitor assembly according to the prior art.
Figure 2B:
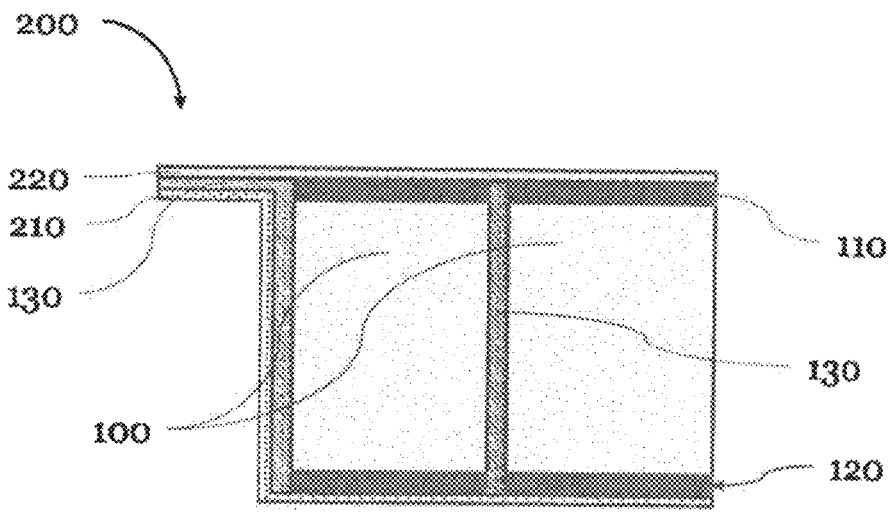
FIG. 2B is a side view, by way of example, of the capacitor assembly from FIG. 2A.

FIGS. 2A and 2B are, respectively, a perspective view and a side view, by way of example, of a capacitor assembly 200 of the prior art. In this case, an assembly is shown which comprises four individual capacitors 100. However, the view shown in FIG. 2A, by way of example, of a capacitor assembly can readily be transferred to an assembly that comprises more or fewer than the number of individual capacitors shown. In this case, the individual capacitors 100 may be capacitors as have been described for example in connection with FIG. 1A and FIG. 1B. In order to electrically connect the individual capacitors to form an assembly, a first joint plate 210 is used which can be arranged on the top side of the assembly and in each case contacts the first electrically conductive layers 110 of the individual capacitors. A second joint plate 220 can be arranged on the bottom side and a lateral side of the assembly. The second joint plate 220 can be L-shaped. The second joint plate 220 in each case contacts the second electrically conductive layers 120 of the individual capacitors. The first joint plate 210 and the second joint plate 220 are electrically isolated from one another, at corresponding portions of the first joint plate 210 and of the second joint plate 220, by an isolation layer 230, such that the capacitors are interconnected in parallel. However, the L-shape of the second joint plate 220 has an unfavorable effect on the parasitic inductances, since the L-shape constitutes a partial loop, and thus has a non-negligible self-inductance, which has a disadvantageous effect in particular at high frequencies.

Figures 3A, 3B:
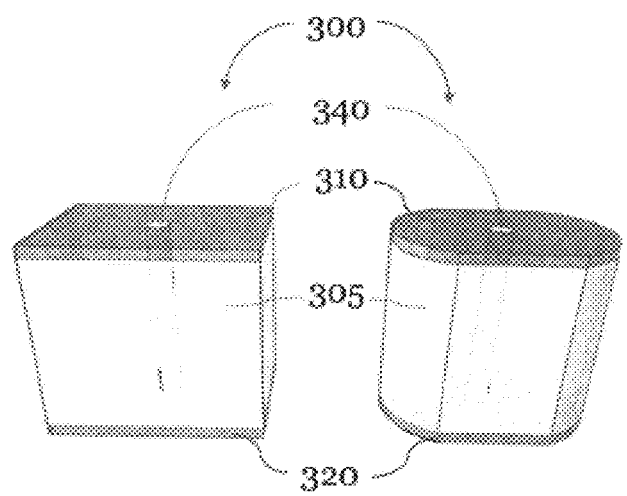
FIG. 3A is an oblique view of a film capacitor according to the invention in the form of a stacked capacitor according to an embodiment.
FIG. 3B is an oblique view of a film capacitor according to the invention in the form of a flat winding according to an embodiment.

FIG. 3A is an oblique view of a film capacitor 300 according to the invention in the form of a stacked capacitor according to an embodiment, the basic shape of which is constructed as described above with respect to FIG. 1A. The capacitor 300 shown is constructed from dielectric films 305 which are arranged in layers one above the other and which can be metallized entirely, in part, or not at all. The dielectric films may for example comprise plastics films consisting of a suitable dielectric material, it being possible for example for polyester (PET), polyethylene naphthalate (PEN), polyphenylene sulfide (PPS), polypropylene (PP), polytetrafluoroethylene (PTFE), polystyrene (PS), polycarbonate (PC), or similar plastics materials, to be selected as the dielectric material for the plastics films, according to the desired operating parameters of the capacitor. Correspondingly suitable papers can also be possible as dielectric films.

The stacked capacitor comprises a first and second end side face in each case, on the surfaces of which a first electrically conductive layer 310 and a second electrically conductive layer 320 are arranged, correspondingly, in each case. The electrically conductive layers 310 and 320 are arranged such that the surface normals thereof are perpendicular to the surface normals of the dielectric films of the capacitor which are arranged in layers one above the other. The electrically conductive layers 310 and 320 serve as a contact surface for electrical contacting of the capacitor. The electrically conductive layers 310 and 320 can also be designed as schoopage layers.

FIG. 3B is an oblique view of a film capacitor 300 according to the invention in the form of a flat-wound capacitor according to a preferred embodiment, the basic shape of which is constructed as described above with respect to FIG. 1B. The capacitor 300 shown is constructed from dielectric films 305 which can be metallized entirely, in part, or not at all. As in the case of the film capacitor shown in FIG. 3A, the dielectric films may for example comprise plastics films consisting of a suitable dielectric material, it being possible for example for polyester (PET), polyethylene naphthalate (PEN), polyphenylene sulfide (PPS), polypropylene (PP), polytetrafluoroethylene (PTFE), polystyrene (PS), polycarbonate (PC), or similar plastics materials, to be selected as the dielectric material for the plastics films, according to the desired operating parameters of the capacitor. Correspondingly suitable papers can also be possible as dielectric films.

The wound capacitor comprises a first and second end side face in each case, on the surfaces of which a first electrically conductive layer 310 and a second electrically conductive layer 320 is arranged, correspondingly, in each case. The electrically conductive layers 310 and 320 are arranged such that the surface normals thereof are perpendicular to the surface normals of the wound dielectric films of the capacitor. The electrically conductive layers 310 and 320 serve as a contact surface for electrical contacting of the capacitor 300. The electrically conductive layers 310 and 320 can be designed as schoopage layers.

In contrast with the capacitors of the prior art, shown by way of example in FIGS. 1A and 1B, the film capacitor 300 according to the invention in FIG. 3A (stacked capacitor) and 3B (flat-wound capacitor) comprises a passage 340 which extends from the outer surface of the first electrically conductive layer 310 to the outer surface of the second electrically conductive layer 320. Said passage 340 is formed by removing capacitor material, for example parts of the dielectric films of the film capacitor and (if present) parts of a flexible core tube, which served as the winding core. In this case, the passage 340 can extend in a substantially perpendicular direction or at an angle with respect to the electrically conductive layers. In this case the passage 340 may be shaped uniformly or may have a lateral surface that is of different dimensions in different portions of the passage 340. The base area of the passage 340 may have a circular or elliptical surface area. However, in general the base area may be of any desired surface shape, for example the shape of a polygon. The passage 340 can be arranged centrally in the first, the second, or in the first and second electrically conductive layer. The passage 340 can, however, also be arranged in the first, the second, or in the first and second electrically conductive layer 310 and 320 so as to be off-center in the first and second electrically conductive layer 310 and 320, respectively.

Figure 3C:
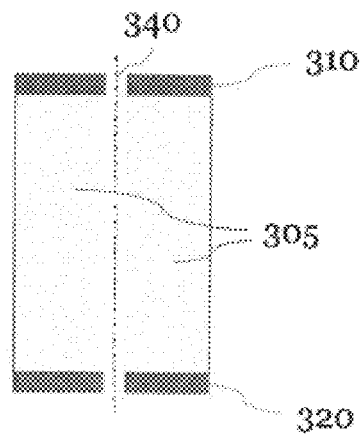
FIG. 3C is a cross-sectional view of a film capacitor according to the invention according to an embodiment.

FIG. 3C is a cross-sectional view of a film capacitor 300 according to the invention according to a preferred embodiment. The capacitor shown comprises dielectric films 305 which may be wound or layered. The dielectric films may comprise films made of dielectric material, as shown above with respect to FIGS. 3A and 3B.

A first electrically conductive layer 310 is arranged on the end faces, in each case, and a second electrically conductive layer 320 is arranged on the opposing side. Furthermore, a passage 340 is formed which extends from the outer surface of the first electrically conductive layer 310 to the outer surface of the second electrically conductive layer 320. Said passage 340 can be formed by removal of capacitor material, for example parts of the dielectric films of the film capacitor and (if present) parts of a flexible core tube, which served as a winding core. In this case, the individual elements and components of the capacitor can be arranged and formed as has been described for example in connection with FIGS. 3A and 3B.

The electrically conductive layers 310, 320 of the film capacitors are suitable for being electrically connected to connection elements. The film capacitors can be electrically connected for example to a printed circuit board via said connection elements, by soldering or welding, or any other suitable manner of connection.

The above-described passage 340 according to the invention, through the film capacitor, allows for the use of an electrical connecting line 350 (see for example FIG. 4B) which extends from the first 310 or second 320 electrically conductive layer on one end face of the capacitor 300, through the passage 340, to the other end face, respectively. Here, the electrical connecting line 350 is connected to a connection element, such that the respective connection elements for the two electrically conductive layers or connecting poles of the capacitor can be arranged on just one side of the capacitor. In this way, routings are avoided which are arranged on the outside, around the capacitor. This leads on the one hand to a saving of line material, but on the other hand in particular also to a significant reduction in parasitic inductances. Any desired number of capacitor assemblies, formed in this way, can be arranged in parallel or in series, and side-by-side or one above the other, and thus form larger tightly packed capacitor assemblies. Furthermore, the individual capacitors can be arranged in an alternating manner, with respect to the polarity thereof. Thus, adjacent individual capacitors can be arranged, oriented and electrically contacted such that a first capacitor has a first polarity, and a second adjacent capacitor has an opposing polarity.

A method for manufacturing the film capacitor according to the invention essentially comprises two steps. In a first step, a film capacitor in the form of a flat-wound capacitor or stacked capacitor is manufactured by means of methods known from the prior art. For example, firstly a film capacitor in the form of a round winding is manufactured by winding metallized dielectric films onto a winding mandrel. Subsequently, the winding mandrel is removed from the center of the round winding, or the winding resulting from winding the dielectric films is removed from the winding mandrel. The removed winding is then deformed or pressed flat, under pressure. In this case, the opening originally left behind by the removed winding mandrel is then completely pressed together and closed by the deformation step, such that there is no longer any opening present. A capacitor in the form of a flat winding is obtained by the deformation. When a flexible core tube is used as the winding core, the core tube can also remain in the center of the round winding. The flexible core tube is then pressed together with the winding, such that there is no longer any opening present.

Alternatively, a stacked capacitor can be produced by layering dielectric films one on top of the other.

In an additional step, the passage according to the invention is subsequently created. In this case, said step comprises the removal of capacitor material, for example parts of the dielectric films of the film capacitor and (if present) parts of a flexible core tube, which served as a winding core, of the film capacitor manufactured in the first step. The removal of capacitor material can generally take place using any suitable production method, e.g. by machining methods. The removal of capacitor material can preferably take place by means of a drilling procedure, it being possible for the drilling procedure to be carried out using a cutting drill. The cutting drill comprises commercially available HSS drills for metal and plastics processing. However, the passage can for example also be produced by milling or using a laser.

The drilling procedure can be performed using one or more optimized parameters, the one or more optimized parameters including an optimized drilling speed and/or an optimized advancement speed. In this respect, the drilling procedure can also be performed in a manner having an oscillating advancement. In this case, the drilling procedure is performed in a manner having a continuous advancement, the continuous advancement being repeatedly temporarily reversed.

The method according to the invention for manufacturing a film capacitor according to the invention has the advantage that the film capacitor is firstly manufactured according to one of the known manufacturing methods, such that initially no changes or additional costs arise during the manufacturing. Only then is the passage created, in an additional step, it being possible for this step, too, to be performed in a cost-effective manner.

Figure 4A:
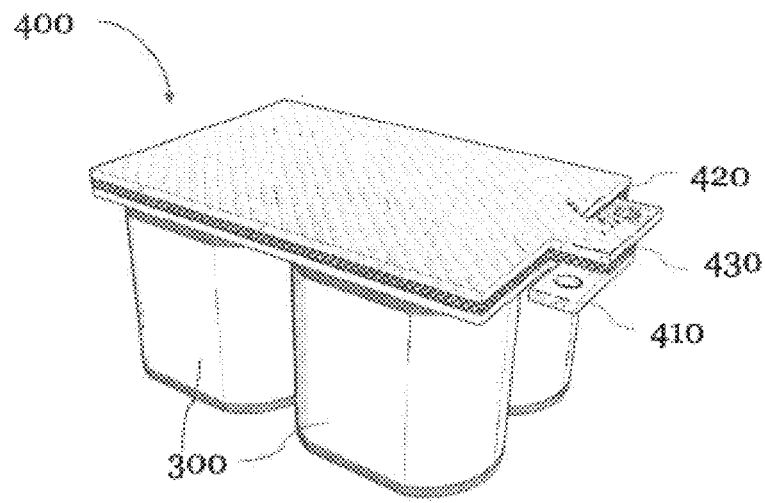
FIG. 4A is a perspective view of a capacitor assembly according to the invention according to an embodiment.
Figure 4B:
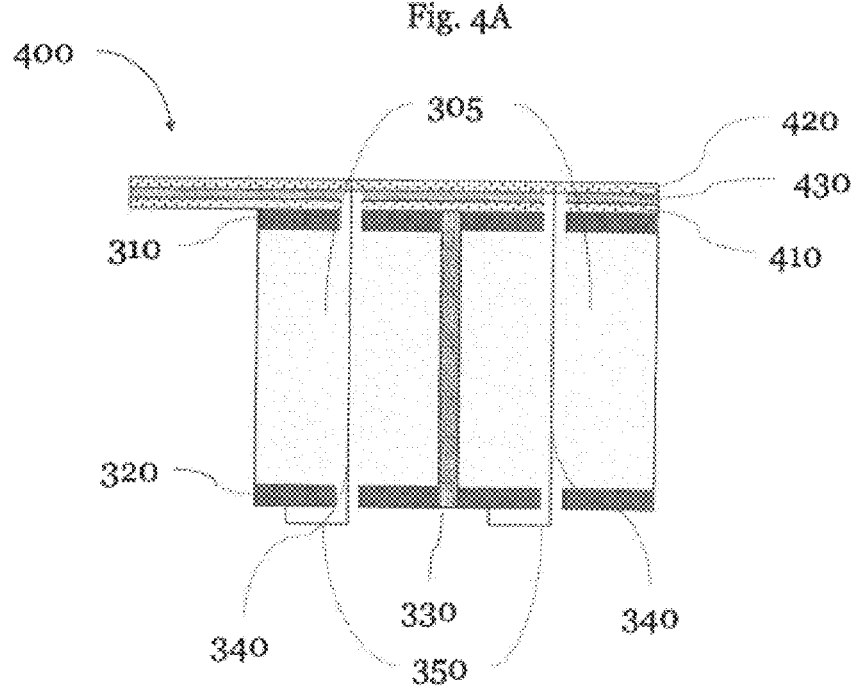
FIG. 4B is a cross-sectional view of the capacitor assembly from FIG. 4A.

In the following, the way in which a plurality of capacitors can be interconnected to form a capacitor assembly is described. FIGS. 4A and 4B are, respectively, a perspective view and a cross-sectional view of a capacitor assembly 400 according to the invention, according to a first embodiment. In this case, a capacitor assembly 400 is shown which comprises four individual film capacitors 300, as are described for example in connection with FIGS. 3A, 3B and 3C and which are connected in parallel. However, it should be clear to a person skilled in the art that the view shown in FIG. 4A, by way of example, of a capacitor assembly comprising four film capacitors can readily be transferred to an assembly that comprises more or fewer than the number of individual capacitors shown.

For example, in the case of a capacitor assembly comprising just one film capacitor 300, a first connection element 410 can be connected to the first 310 or the second 320 electrically conductive layer of the film capacitor 300. A second connection element 420 is connected to the other electrically conductive layer, in each case, by an electrically conductive connection 350 which is guided through the passage 340. In this case, the first and the second connection element 410 and 420, respectively, are arranged so as to be electrically isolated from one another, side-by-side or one above the other, on the same end side face of the film capacitor 300, which is opposite the electrically conductive layer that is connected to the electrically conductive connection 350.

In the case of a capacitor assembly comprising a plurality of film capacitors, these can in each case be coupled or contacted with one another in series or in parallel, by means of a plurality of connection elements. Optionally, one or more additional connection elements are utilized as neutral conductors. In this case, all the connection elements are arranged so as to be electrically isolated from one another, side-by-side or one above the other on the end side faces of the film capacitors of the capacitor assemblies which are opposite the electrically conductive layers of the film capacitors that are contacted by the electrically conductive connections.

In FIG. 4A and FIG. 4B, the capacitors 300 of the capacitor assembly 400 are arranged side-by-side. They can, however, also be arranged one above the other, or side-by-side and one above the other. In this case, the individual capacitors 300 are film capacitors as have been described for example in connection with FIG. 3A, 3B and FIG. 3C. The individual film capacitors can be electrically isolated from one another by means of a suitable isolation or isolation layer 330. In order to electrically interconnect the individual film capacitors, for example a first joint plate 410 is arranged, as a first connection element 410, on the first electrically conductive layer 310, in each case, of the individual film capacitors, and electrically contacts said capacitors. Furthermore, a second joint plate 420 is arranged on the outer surface of the first joint plate 410, as a second connection element 420. An isolation layer 430 is arranged between the first joint plate 410 and the second joint plate 420, which isolation layer electrically isolates the first joint plate 410 and the second joint plate 420 from one another. The second joint plate 420 can contact the second electrically conductive layers 320, in each case, of the individual film capacitors 300, without in the process guiding line elements around the assembly 400, as has been described for example in connection with FIGS. 2A and 2B. For this purpose, recesses are arranged in the first joint plate 410 and in the isolation layer 430 located between the first joint plate 410 and second joint plate 420, at portions on which in each case the passages 340 of the individual film capacitors 300 are arranged with respect to the first joint plate 410 and the isolation layer 430 located between the first joint plate 410 and the second joint plate 420. The second joint plate 420 can thus contact the second electrically conductive layers 320 of the individual film capacitors 300, located in each case on the opposing end face, by means of connecting lines 350 which in each case extend through the passages 340 and contact the second electrically conductive layers 320 in each case. Instead of the joint plates, used by way of example as connection elements in the embodiment in the figures, for example conductors, wires, flat wires, gratings or busbars, or also any other conductor configurations suitable as connection elements, can also be used for the connection elements 410, 420. The first and second connection elements can also be designed differently.

Such a configuration and arrangement of the individual components and elements has several advantages. Since currents flow in opposite directions, in each case, in the first connection element 410 and in the second connection element 420, which are arranged adjacently and in parallel with one another, the magnetic fields generated in the connection elements 410 and 420 compensate one another. This leads to a significant reduction of parasitic inductances. Since the connection elements 410 and 420 cover the one or more capacitors 300 on just one side, the capacitor assembly 400 can furthermore be cooled significantly more efficiently and more uniformly, since the majority of the cabling is provided on just one side, and an increased number of connection elements for integral cooling is possible.

Adjacent individual capacitors 300 can also be arranged such that a first capacitor has a first polarity at the first electrically conductive layer 310 thereof, and a second adjacent capacitor has a second polarity at the first electrically conductive layer 310 thereof, which is opposite to the polarity of the first conductive layer 310 of the first adjacent capacitor. The first and second connection elements 410 and 420 are then correspondingly connected to the first and second conductive layers 310 and 320 of the capacitors such that the first connection element is assigned one polarity, and the second connection element is assigned the corresponding opposite polarity.

Figure 5:
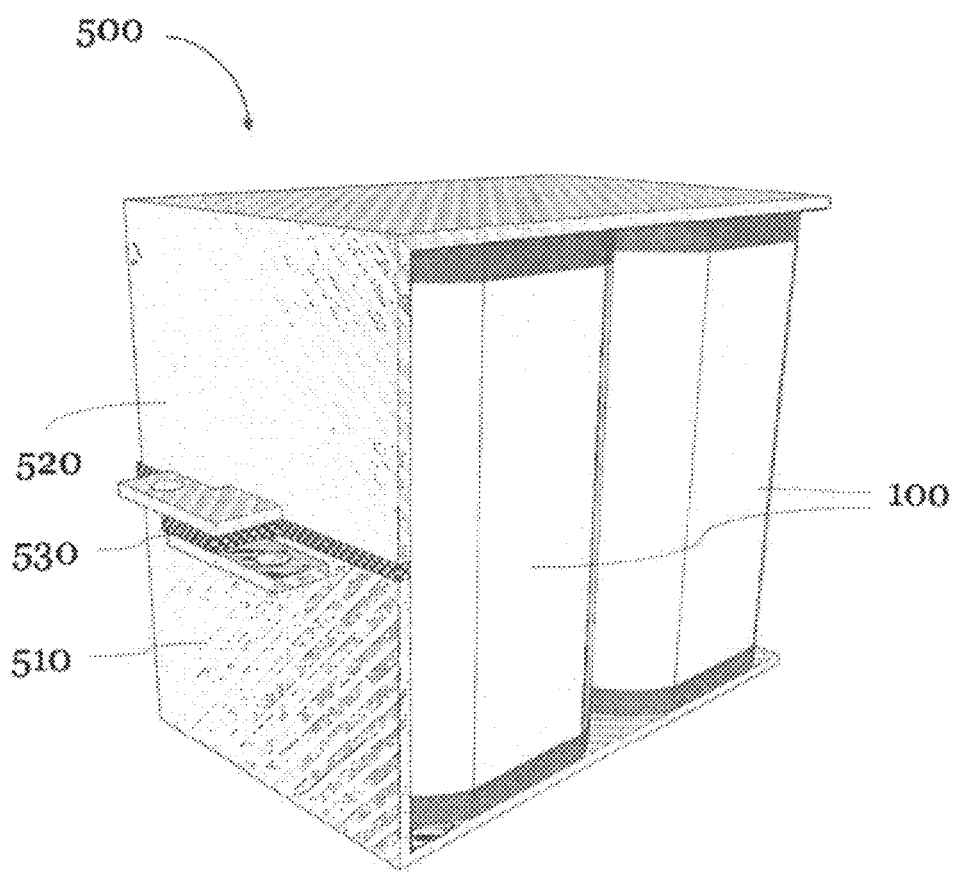
FIG. 5 is a perspective view, by way of example, of a capacitor assembly according to the prior art comprising parallel interconnections by way of busbars.

FIG. 5 shows a capacitor assembly 500 of the prior art (similar to that shown in FIG. 2A) comprising four film capacitors 100 (flat-wound, stacked, or round-wound capacitors) arranged side-by-side, which are interconnected in parallel by joint plates 510 and 520, known as busbars. One busbar contacts the first electrically conductive layers of the film capacitors, and a second busbar contacts the second electrically conductive layers of the film capacitors. The two busbars 510, 520 are arranged on the outside of the film capacitors and extend through an isolation 530 in a manner electrically isolated from one another, and run together at a connection point, e.g. for connection to an IGBT.

Figure 6A:
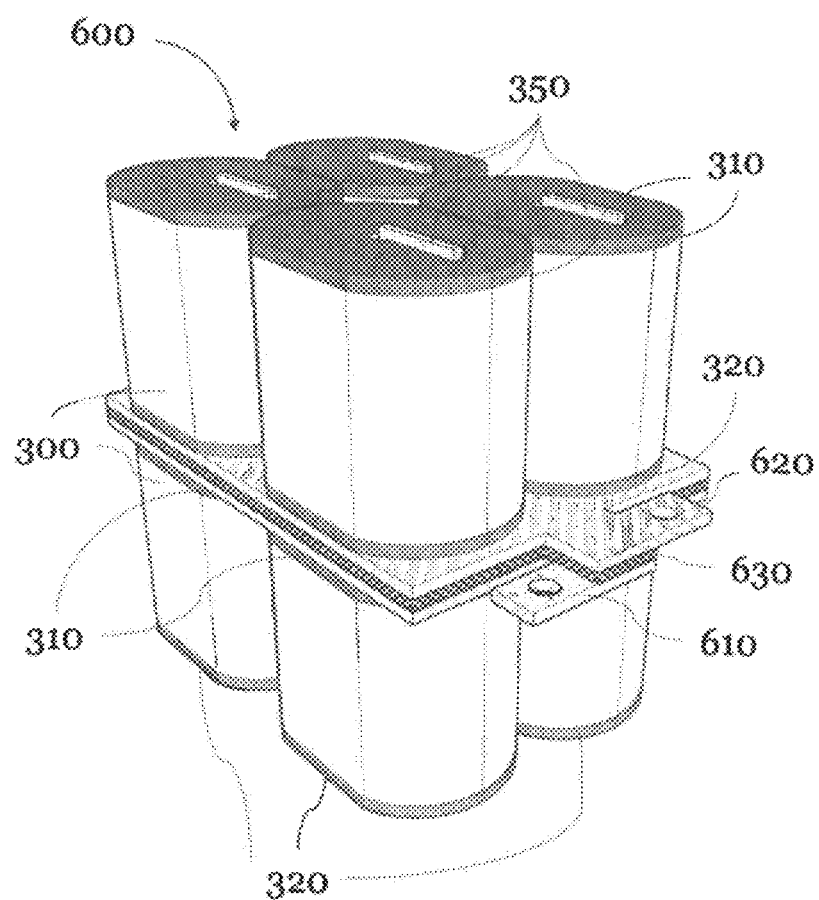
FIG. 6A shows two capacitor assemblies arranged one above the other and comprising parallel interconnections, according to the invention.

FIG. 6A shows a capacitor assembly 600 consisting of two capacitor subassemblies, similar to those shown in FIG. 4A, each comprising four film capacitors (flat-wound, stacked, or round-wound capacitors) which are arranged in two courses, one above the other. In this case, the first and second electrically conductive layers 310, 320 of the film capacitors 300 in each case correspondingly contact a first connection element 610 and a second connection element 620 of the capacitor assembly 600, in order to form a parallel connection of the film capacitors 300. As set out above with respect to FIG. 4B, in each case recesses in the connection elements 610, 620, designed by way of example in FIG. 6A as joint plates, and the isolation 630 allow for the parallel interconnection of the film capacitors 300. Reference sign 350 denotes the connecting lines which are contacted at the outer electrically conductive layers of the film capacitors of the capacitor subassemblies arranged at the top or bottom for example by means of soldering, and which extend in each case through the passages 340 of the film capacitors 300, in order to then contact the first or second connection element.

A first joint plate 610 of the joint plates arranged centrally between the film capacitor courses or subassemblies is directly connected to the corresponding centrally arranged first electrically conductive layers 310 of the film capacitors of the first capacitor subassembly. A second joint plate 620 arranged centrally between the film capacitor courses is directly connected to the corresponding centrally arranged second electrically conductive layers 320 of the film capacitors of the second capacitor subassembly. The electrically conductive layers 310 and 320 of the film capacitors of the two capacitor subassemblies that are arranged on the outside (at the top and bottom, on the capacitor assembly 600, in FIG. 6A) are in each case connected to the first and second joint plates 610 and 620, by means of connecting lines 350 extending through the passages of the film capacitors, such that the first joint plate 610 contacts the first electrically conductive layer 310 of the film capacitors of the second (top) capacitor subassembly, and the second joint plate 620 contacts the second electrically conductive layer 320 of the film capacitors of the first (bottom) capacitor subassembly.

It has been found that such a division of a large film capacitor of the prior art, as shown in FIG. 5, into two film capacitors of half winding height and joint plates arranged between the film capacitors, as shown in FIG. 6A, leads to extremely low inductance which is smaller, by approximately a factor of 10, than in the case of a large film capacitor of the prior art. This is in particular due to the absolutely symmetrical capacitor structure, without induction loops. The thermal losses during operation under load are also smaller by approximately a factor of 4, since halving the winding height compared with the film capacitor assembly of the prior art achieves a disproportionate reduction in the capacitor internal resistance and thus the thermal losses, at an almost identical volume and at identical electrical values (capacitance and nominal voltage) as in the film capacitor assembly of the prior art shown in FIG. 5.

Figure 6B:
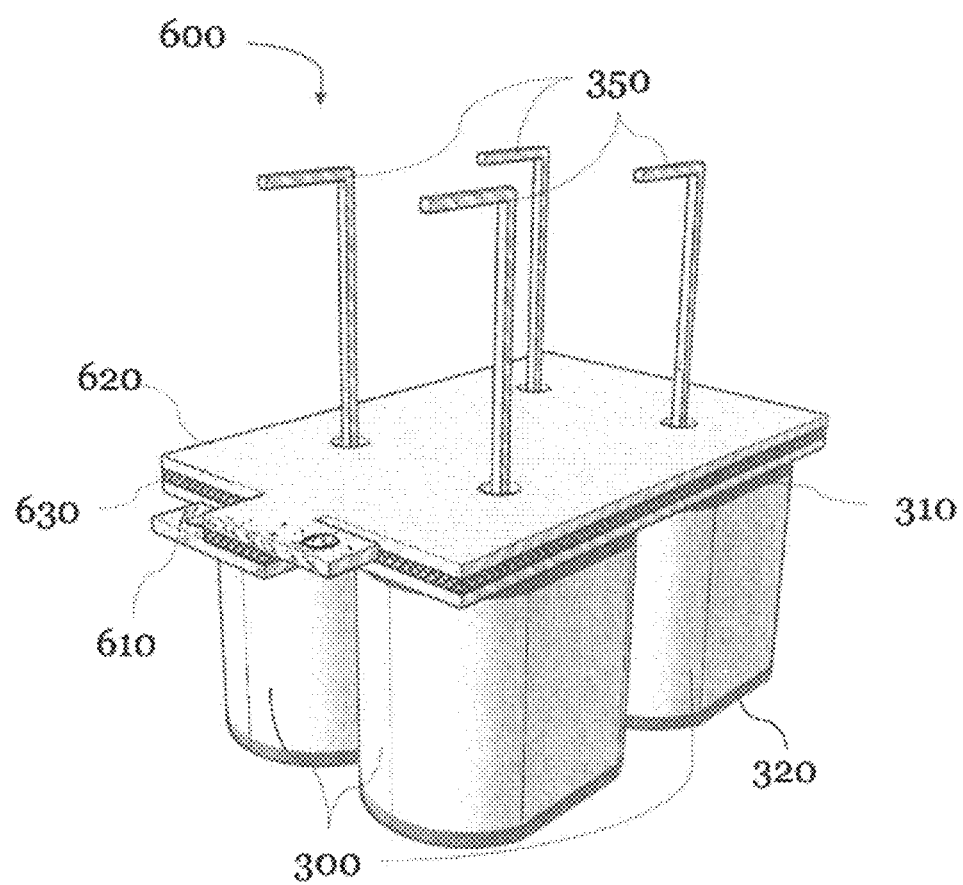
FIG. 6B shows details of the parallel interconnections, according to the invention, of two capacitor assemblies arranged one above the other.

FIG. 6B shows a first connection element 610 in the form of a first joint plate 610 which is directly connected to the first electrically conductive layers 310 of the bottom course of film capacitors and also comprises electrical connecting lines 350, upwards, via which the connection to the first electrically conductive layers 310 of the upper course of film capacitors is achieved. A second connection element 620 in the form of a second joint plate 620 lies on the first connection element 610 in a manner electrically isolated by an isolation layer 630. Recesses for the electrical connecting lines 350 connected to the first joint plate 310 are provided in the second joint plate 620 and the isolation layer 630. As shown in FIG. 6A, the second joint plate 620 directly contacts the second electrically conductive layers 320 of the top course of film capacitors. Just like the first joint plate 610, the second joint plate 620 also comprises electrical connection lines 350 (not shown) which extend downwards through the film capacitors of the first subassembly and electrically contact the respective second electrically conductive layers 320 of the bottom course of film capacitors. For this purpose, corresponding recesses are also provided in the first joint plate 610 and the isolation layer 630.

Two courses of four film capacitors in each case are shown by way of example in FIGS. 6A and 6B. However, the courses can also comprise more or fewer film capacitors.

The film capacitors shown by way of example in FIGS. 6A and 6B comprise passages as have been described with respect to the film capacitors according to the invention of FIGS. 3a, 3B and 3C. In the case of film capacitors without a passage according to the invention or a hollow winding core, the connecting lines can also extend on the outside of the film capacitors.

Figure 7A:
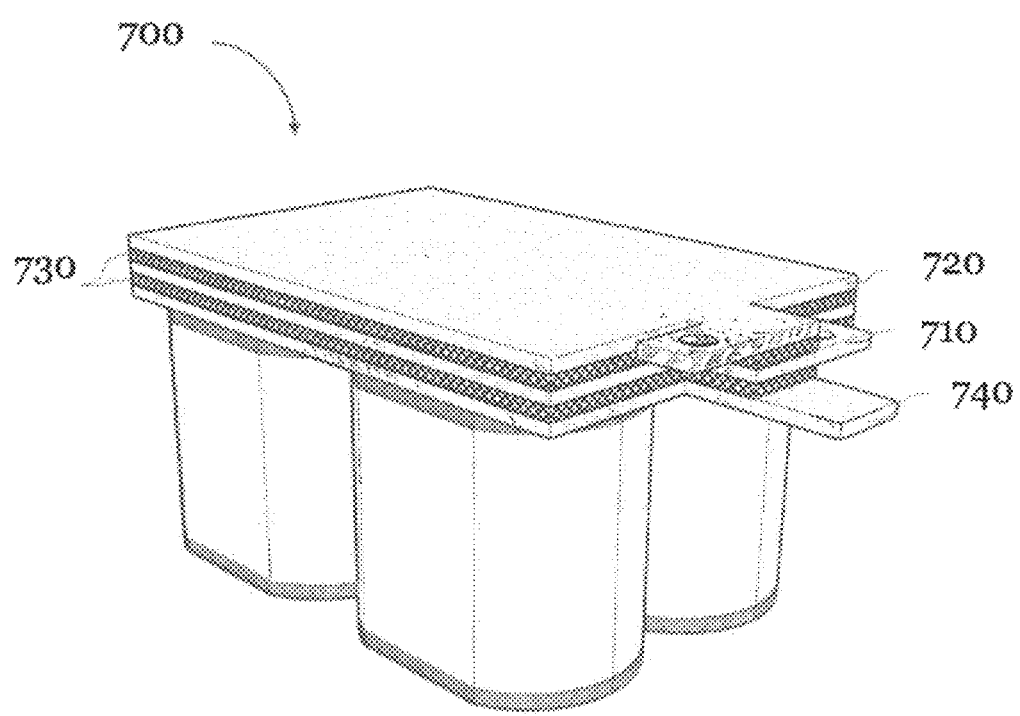
FIG. 7A shows a capacitor assembly according to the invention according to a further embodiment.

FIG. 7A shows, by way of example, a capacitor assembly 700 according to the invention, according to a further embodiment which is a modification of the embodiment described in FIGS. 4A and 4B. Two capacitor subassemblies, each comprising of one film capacitor, are connected in series by means of three connection elements 710, 720, 740 which are electrically isolated from one another by means of isolations 730. Recesses (not shown) in the connection elements 710, 720, 740, designed by way of example as joint plates, and the isolations 730 allow for the contacting of the individual connection elements which is utilized for the series connection. It is also possible for more than two capacitor subassemblies to be interconnected in series, by means of a corresponding number of connection elements. In this case, the capacitor subassemblies can each consist of a capacitor assembly comprising just one film capacitor, or of a capacitor assembly comprising a plurality of film capacitors connected in parallel (as shown for example with reference to FIGS. 4A and 4B).

Figure 7B:
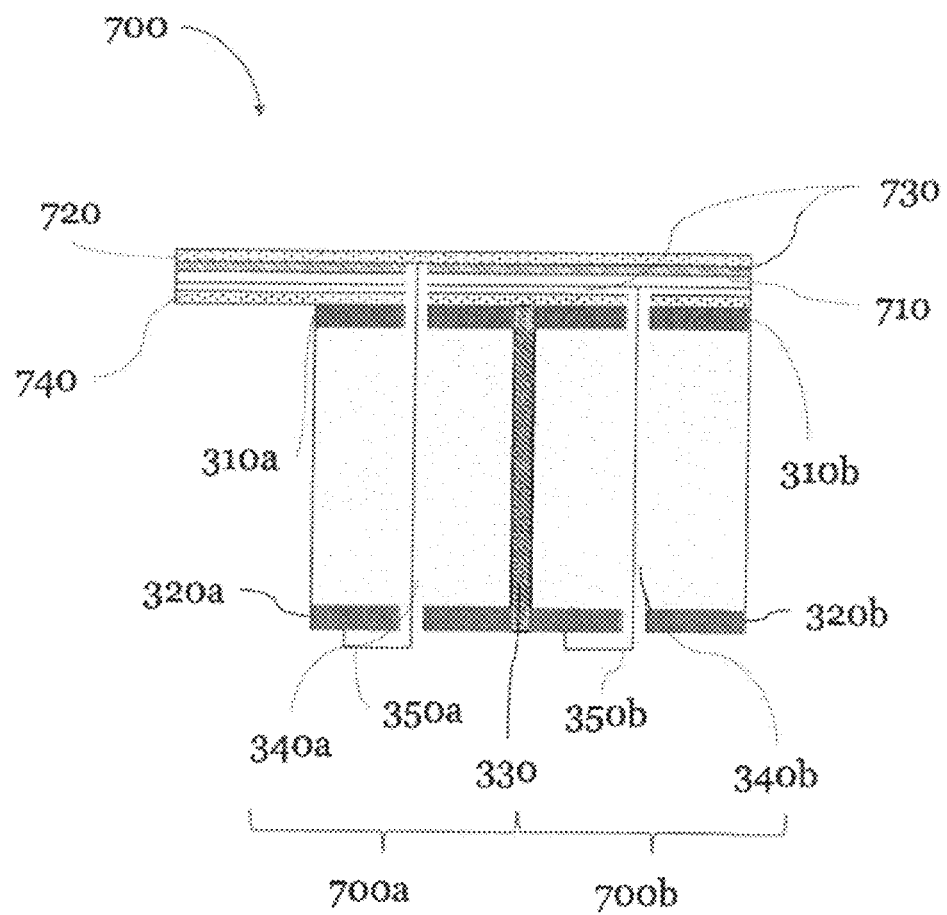
FIG. 7B is a cross-sectional view of the capacitor assembly according to the invention according to FIG. 7A.

FIG. 7B is a cross-sectional view of the capacitor assembly 700 according to the invention according to FIG. 7A. The capacitor assembly 700 comprises at least two integrated individual capacitor subassemblies 700a, 700b which are connected in series. The capacitor assembly 700 may comprise n capacitor subassemblies 700a, 700b connected in series. The capacitor subassemblies 700a, 700b may comprise individual capacitors or a plurality of capacitors. It is also possible, for example, for a plurality of capacitor subassemblies, comprising capacitors arranged in parallel, to be connected in series, as were described with respect to FIGS. 4A, 4B and 6A. The capacitor assembly 700 can therefore be expanded as desired.

In order to achieve the desired series connection of the capacitor subassemblies shown, three connection elements 710, 720 and 740 are utilized. In this embodiment, a third connection element 740 is arranged between a first connection element 710 and the first electrically conductive layers 310a, 310b, in each case, of the individual capacitors or capacitor subassemblies. In addition, an isolation or isolation layer 730, which electrically isolates the first connection element 710 and the third connection element 740 from one another, is arranged between the third connection element 740, which functions as a neutral conductor, and the first connection element 710. The series connection optionally results in an alternating interconnection of the windings at the polarity.

Recesses, which are arranged according to the positions of the passages 340a, 340b of the capacitors or the capacitor subassemblies 700a, 700b of the capacitor assembly 700, are arranged in corresponding portions of the third connection element 740 and the isolation layer 730, between the third connection element 740 and the first connection element 710. Via said recesses, the first connection element 710 can contact the second electrically conductive layer 320b of the second capacitor subassembly 700b by means of a connecting line 350b, which extends through the passage 340b. Furthermore, recesses, which are arranged according to the position of the passage 340a of the capacitor of a further capacitor subassembly 700a of the capacitor assembly 700, are arranged in corresponding portions of the third connection element 740 and the isolation layer 730, between the third connection element 740 and the first connection element 710, and of the isolation layer 730 between the first connection element 710 and the second connection element 720, and of the first connection element 710. The second connection element 720 can thereby contact the second electrically conductive layers 320a of the capacitor subassembly 700a by means of a connecting line 350a, which extends through the passage 340a. Individual capacitors can be arranged such that in each case closest neighbors of the individual capacitors belong, in each case, to another capacitor subassembly. The capacitor assembly 700 described has the same advantages as have already been explained in connection with FIGS. 4A and 4B. In the embodiment shown in FIGS. 7A and 7B, joint plates were used as connection elements. However, for example conductors, wires, flat wires, gratings, or busbars can also be used as connection elements.

The sequence of the layering of the individual connection elements 710, 720 and 740 can be varied as desired, while maintaining the above-described contacting systematics. As described above with respect to FIG. 7A, it is also possible for more than two capacitor subassemblies to be interconnected in series, by means of a corresponding number of connection elements and the contacting thereof.

Figure 8:
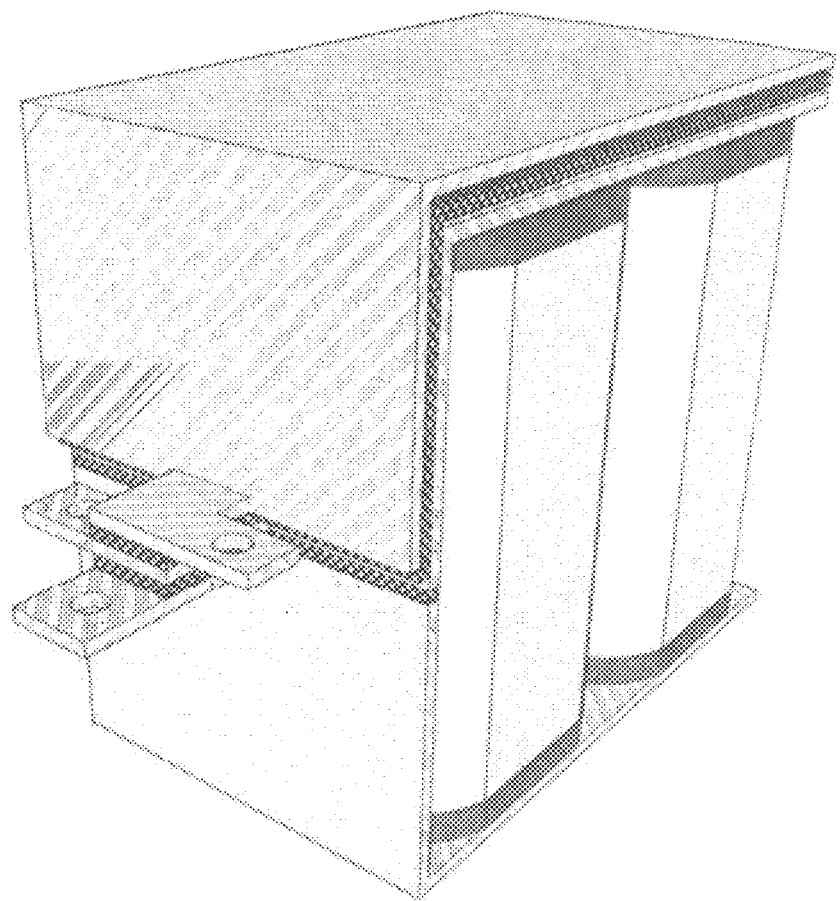
FIG. 8 is a perspective view, by way of example, of a capacitor assembly according to the prior art comprising series interconnections by way of busbars.

FIG. 8 shows a capacitor assembly of the prior art comprising four film capacitors (flat-wound, stacked, or round-wound capacitors) arranged side-by-side, which are interconnected in series by joint plates, known as busbars. One busbar contacts the first electrically conductive layers of the film capacitors, and a second busbar contacts the second electrically conductive layers of the film capacitors. A third busbar serves as a neutral conductor. The busbars are electrically isolated from one another. All the busbars are arranged on the outside of the film capacitors and run together at a connection point, e.g. for connection to an IGBT.

Figure 9A:
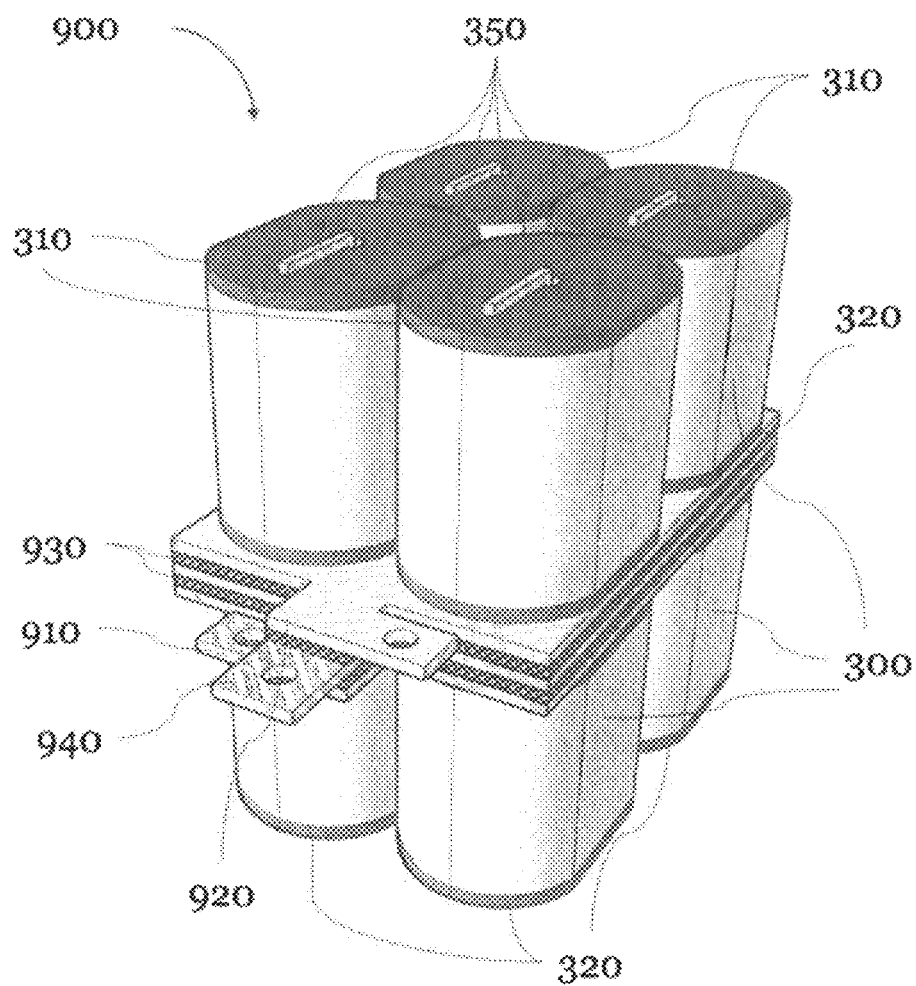
FIG. 9A shows two capacitor assemblies arranged one above the other and comprising series interconnections, according to the invention.

FIG. 9A shows, by way of example, a capacitor assembly according to the invention consisting of two capacitor subassemblies 900 each comprising four film capacitors (flat-wound, stacked, or round-wound capacitors) which are arranged in two courses, one above the other. In this case, a first connection element 910 contacts the first electrically conductive layers 310 of the film capacitors 300 of the first capacitor subassembly, and a second connection element 920 contacts the second electrically conductive layers 320 of the film capacitors 300 of the second capacitor subassembly. A third connection element 940 functions as a neutral conductor and contacts the second electrically conductive layer 320, in each case, of the film capacitors of the first subassembly, by means of a first connecting line 350, and contacts the first electrically conductive layer 310, in each case, of the film capacitors 300 of the second subassembly, by means of a second connecting line 350. Said first and second connecting lines can extend through inner passages in the film capacitors, from the first electrically conductive layer in each case, to the second electrically conductive layer in each case, or past the film capacitors on the outside. As a result, a series interconnection of the film capacitors is achieved. The individual connection elements 910, 920 and 940 are electrically isolated from one another by isolation layers 930.

Figure 9B:
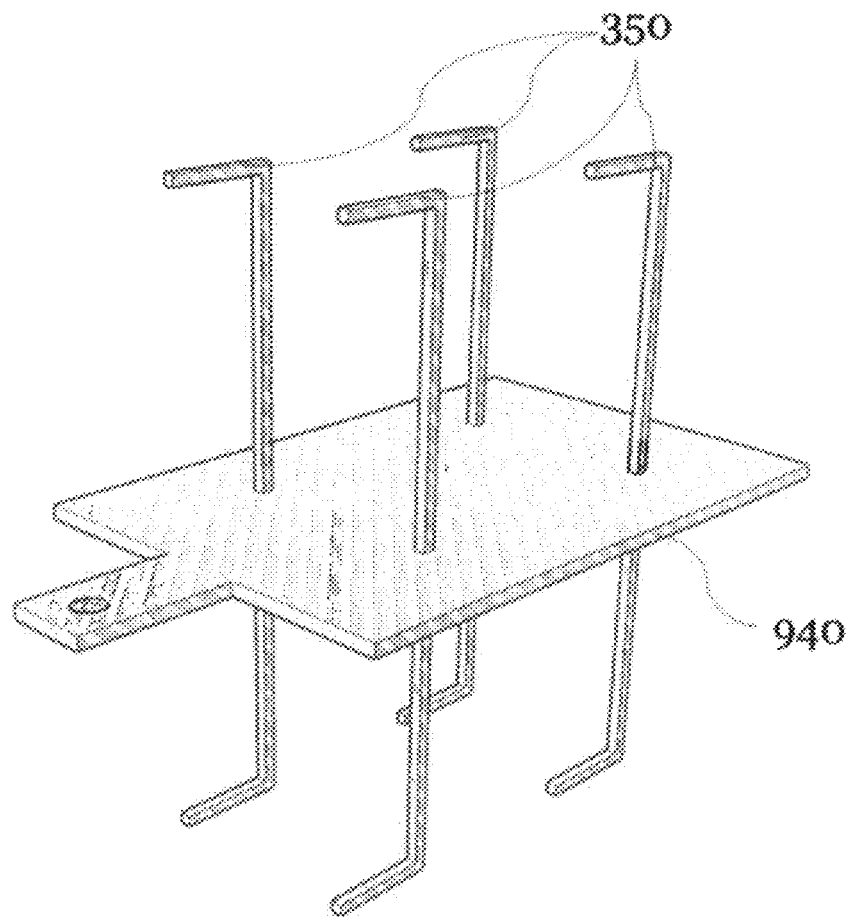
FIGS. 9B and 9C show details of the series interconnections, according to the invention, of two capacitor assemblies arranged one above the other/
Figure 9C:
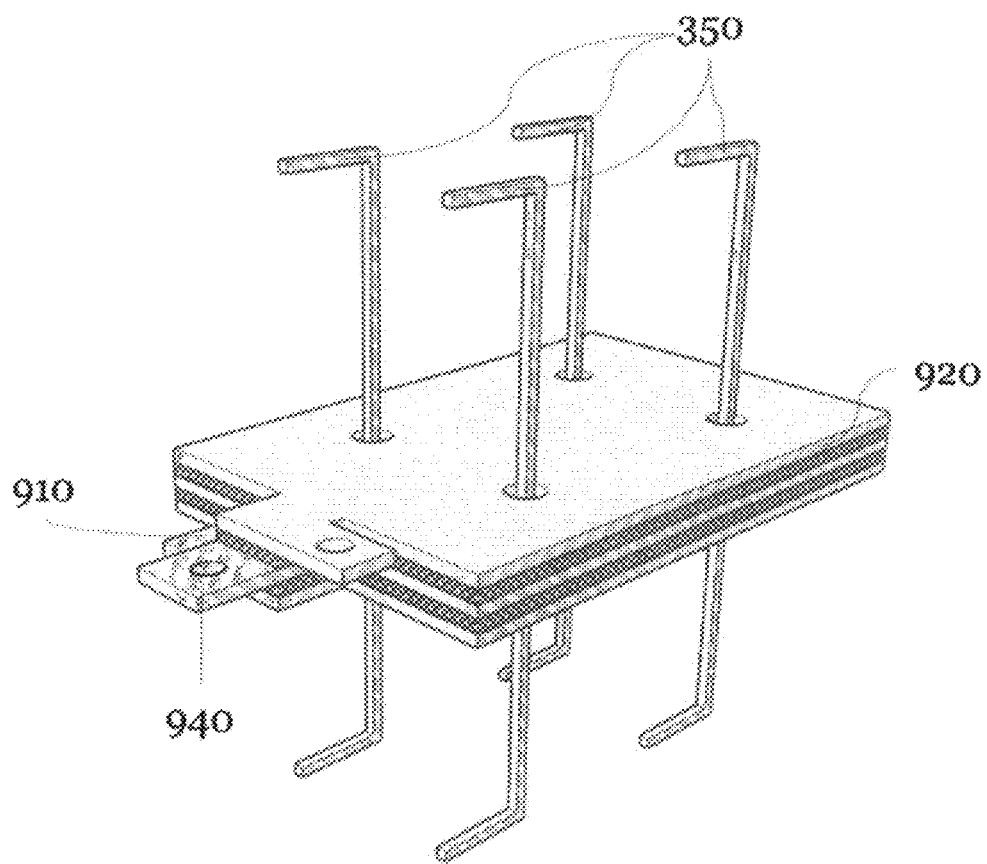

As set out above with respect to FIG. 4B, in each case recesses in the connection elements 910, 920, 940, designed by way of example in FIG. 9A to 9C as joint plates, and the isolation 930 allow for the series interconnection of the film capacitors. Reference sign 350 denotes the connecting lines which proceed from the third connection element 940, functioning as a neutral conductor, and which contact the outer electrically conductive layers of the film capacitors of the top or the bottom capacitor assembly or capacitor courses, for example by soldering.

The first and second joint plates 910 and 920, arranged centrally between the film capacitor courses, are directly connected to the corresponding centrally arranged first and second electrically conductive layers 310, 320, respectively, of the film capacitors 300.

It has been found here too that such a division of a large film capacitor of the prior art, as shown in FIG. 8, into two film capacitors of half winding height and joint plates arranged between the film capacitors, as shown in FIG. 9A, leads to extremely low inductance which is smaller, by approximately a factor of 10, than in the case of a large film capacitor of the prior art. This is in particular due to the absolutely symmetrical capacitor structure, without induction loops. The thermal losses during operation under load are also smaller by approximately a factor of 4, since halving the winding height compared with the film capacitor assembly of the prior art achieves a disproportionate reduction in the capacitor internal resistance and thus the thermal losses, at an almost identical volume and at identical electrical values (capacitance and nominal voltage) as in the film capacitor assembly of the prior art shown in FIG. 8.

The film capacitors shown by way of example in FIG. 9A to 9C comprise passages as have been described with respect to the film capacitors according to the invention of FIGS. 3A, 3B and 3C. In the case of film capacitors without a passage according to the invention or a hollow winding core, the connecting lines can also extend on the outside of the film capacitors.

FIGS. 4A, 4B, 6A, 6B, 7A, 7B and 9A to 9C show, by way of example, parallel and series couplings of four film capacitors 300 in each case. In this case, the connection elements can also be arranged differently from the manner shown, in particular also in a different sequence, one above the other or side-by-side. Likewise, the number of film capacitors is not limited to four, and may include more of fewer film capacitor The following paragraphs describe additional embodiments.

In some embodiments, a film capacitor (300) for power electronics, comprises: a first electrically conductive layer (310), which is arranged on a first end side face of the film capacitor (300), the surface normal of the first electrically conductive layer (310, 310a, 310b) being perpendicular to the surface normals of dielectric films (305) of the film capacitor (300),
a second electrically conductive layer (320, 320a, 320b), which is arranged on a second end side face opposite from the first end side face, the surface normal of the second electrically conductive layer (320, 320a, 320b) being perpendicular to the surface normals of the dielectric films (305) of the film capacitor.
the film capacitor (300) has at least one inner passage (340, 340a, 340b), which extends from the first electrically conductive layer (310, 310a, 310b) to the second electrically conductive layer (320, 320a, 320b), the passage (340, 340a, 340b) being formed by removal of capacitor material.

In some embodiments, the film capacitor (300) is a flat-wound or stacked capacitor.

In some embodiments, the passage (340, 340a, 340b) is a drilled hole.

In some embodiments, the passage (340, 340a, 340b) extends in a substantially perpendicular direction with respect to the first electrically conductive layer (310, 310a, 310b) and the second electrically conductive layer (320, 320a, 320b).

In some embodiments, at least one of the first electrically conductive layer (310, 310a, 310b) and the second electrically conductive layer (320, 320a, 320b) is a schoopage layer.

In some embodiments, the dielectric films (305) of the film capacitor (300) comprise plastics films consisting of polyester (PET), polyethylene naphthalate (PEN), polyphenylene sulfide (PPS), polypropylene (PP), polytetrafluoroethylene (PTFE), polystyrene (PS), or polycarbonate (PC).

In some embodiments, the dielectric films (305) are fully or partially metalized or not metallized.

In some embodiments, an electrically conductive connection (350) is guided from the first (310) or the second (320) electrically conductive layer on one end side face of the film capacitor (300), through the passage (340), to the other end side face, respectively, of the film capacitor (300).

In some embodiments, a first connection element (410) is connected to the first (310) or the second (320) electrically conductive layer of the film capacitor (300), wherein a second connection element (420) is connected to the other electrically conductive layer, in each case, via the electrically conductive connection (350) which is conducted through the passage (340), and wherein the first and the second connection element (410, 420) are arranged so as to be electrically isolated (430) from one another, side-by-side or one above the other, on the same end side face of the film capacitor (300), which is opposite the electrically conductive layer that is connected to the electrically conductive connection (350).

In some embodiments, a plurality of the capacitor assemblies described above are contacted with one another in series or in parallel by means of a plurality of connection elements (410, 420; 710, 720, 740), wherein all the connection elements are arranged so as to be electrically isolated from one another, side-by-side or one above the other on the end side faces of the film capacitors (300) of the capacitor assemblies which are opposite the electrically conductive layers of the film capacitors (300) that are contacted by the electrically conductive connections (350).

In some embodiments, a plurality of the capacitor assemblies described above are arranged side-by-side,
wherein a first connection element (410) is connected to the first electrically conductive layer (310) and/or the second electrically conductive layer (320) of the film capacitors (300) of the capacitor assemblies, in each case,
wherein a second connection element (420) is connected to the first electrically conductive layer (310) and/or the second electrically conductive layer (320) of the film capacitors (300) of the capacitor assemblies, in each case, which are in each case of an opposite polarity with respect to the first and second electrically conductive layers (310, 320), which are connected to the first connection element (410),
wherein the first and the second connection element (410, 420) are arranged so as to be electrically isolated from one another, side-by-side or one above the other, on the same end side face of the film capacitor (300), which is opposite the electrically conductive layer that is connected to the electrically conductive connection (350),
wherein the connection of the first and second connection element (310, 320) to the respective first and second electrically conductive layers is achieved in each case either directly or by means of the electrically conductive connection (350) which is guided through the passage (340) of the relevant film capacitor (300).

In some embodiments, a layer of first capacitor assemblies described above is arranged side-by-side and is arranged above another layer of second capacitor assemblies, where the first and second electrically conductive layers (310, 320) of which further layer in each case correspondingly contact the first connection element (410; 610) and the second connection element (420; 620) of the second capacitor assemblies in order to form a parallel connection of the film capacitors (300).

In some embodiments, an aggregate capacitor assembly comprises a plurality of capacitor subassemblies (700a, 700b), wherein the capacitor subassemblies (700a, 700b) each comprise a capacitor assembly described above. The capacitor subassemblies (700a, 700b) are connected in series by means of a third connection element (740), wherein the first, the second and the third connection element (710, 720, 740) are arranged so as to be electrically isolated from one another, side-by-side or one above the other, on the same end side face of the film capacitor (300), which is opposite the electrically conductive layer that is connected to the electrically conductive connection (350).

In some embodiments, a capacitor assembly comprises a first subassembly comprising:

at least one film capacitor comprising a first electrically conductive layer (310), which is arranged on a first end side face of the film capacitor, wherein the surface normal of the first electrically conductive layer (310) is perpendicular to the surface normals of the films of the film capacitor, and a second electrically conductive layer (320), which is arranged on a second end side face of the film capacitor, opposite the first end side face, in parallel with the first electrically conductive layer (320), a first connection element (610) which contacts the first electrically conductive layer (310) of the at least one film capacitor of the first subassembly, in each case;

a second subassembly which is arranged over the first subassembly and comprises:

at least one film capacitor comprising a first electrically conductive layer (310), which is arranged on a first end side face of the film capacitor, wherein the surface normal of the first electrically conductive layer is perpendicular to the surface normals of the films of the film capacitor, and a second electrically conductive layer (320), which is arranged on a second end side face of the film capacitor, opposite the first end side face, in parallel with the first electrically conductive layer (310), a second connection element (620) which contacts the second electrically conductive layer (320) of the at least one film capacitor of the second subassembly, in each case;

wherein the first connection element (610) in each case contacts the first electrically conductive layer (310) of the at least one film capacitor of the second subassembly, by means of at least one first connecting line (350); and wherein the second connection element (620) in each case contacts the second electrically conductive layer (320) of the at least one film capacitor of the first subassembly, by means of at least one second connecting line (350).

In some embodiments, the at least one film capacitor of the first and the second subassembly in each case comprise at least one inner passage (340) which extends from the first electrically conductive layer (310), in each case, to the second electrically conductive layer (320), in each case; and wherein the at least one first connecting line (350) and the at least one second connecting line (350) extend through the relevant inner passage (340).

In some embodiments, the first connection element (610) and/or the second connection element (620) is arranged at least in part between the first subassembly and the second subassembly.

In some embodiments, the first connection element (610) comprises recesses for conducting through the at least one second connecting line (350) of the second connection element (620), and the second connection element (620) comprises recesses for conducting through the at least one first connecting line (350) of the first connection element (610).

In some embodiments, a capacitor assembly comprises: a first subassembly comprising:

at least one film capacitor comprising a first electrically conductive layer (310), which is arranged on a first end side face of the film capacitor, wherein the surface normal of the first electrically conductive layer (310) is perpendicular to the surface normals of the films of the film capacitor, and a second electrically conductive layer (320), which is arranged on a second end side face of the film capacitor, opposite the first end side face, in parallel with the first electrically conductive layer (310);

a first connection element (910) which contacts the first electrically conductive layer (310) of the at least one film capacitor of the first subassembly, in each case;

a second subassembly which is arranged over the first subassembly and comprises:

at least one film capacitor comprising a first electrically conductive layer (310), which is arranged on a first end side face of the film capacitor, wherein the surface normal of the first electrically conductive layer (310) is perpendicular to the surface normals of the films of the film capacitor, and a second electrically conductive layer (320), which is arranged on a second end side face of the film capacitor, opposite the first end side face, in parallel with the first electrically conductive layer (310), a second connection element (920) which contacts the second electrically conductive layer (320) of the at least one film capacitor of the second subassembly, in each case;

a third connection element (940) comprising:

at least one first connecting line (350) and at least one second connecting line (350), wherein the at least one first connecting line (350) of the third connection element (940) contacts the respective second electrically conductive layer (320) of the at least one film capacitor of the first subassembly, and wherein the at least one second connecting line (350) of the third connection element (940) contacts the respective first electrically conductive layer (310) of the at least one film capacitor of the second subassembly.

In some embodiments, the at least one film capacitor of the first and the second subassembly in each case comprise at least one inner passage (340) which extends from the first electrically conductive layer (310), in each case, to the second electrically conductive layer (320), in each case; and wherein the at least one first connecting line (350) of the third connection element (940), and the at least one second connecting line (350) of the third connection element (940), extend through the relevant inner passage (340) of the film capacitor.

In some embodiments, the first connection element (910) and/or the second connection element (920) and/or the third connection element (940) is arranged at least in part between the first subassembly and the second subassembly.

In some embodiments, the first connection element (910) comprises recesses for conducting through the at least one first connection line (350) of the third connection element (940), and the second connection element (920) comprises recesses for conducting through the at least one second connecting line (350) of the first connection element (940).

In some embodiments, the connection elements (410, 420; 610, 620; 710, 720, 740; 910, 920, 940) are in each case designed as conductors, wires, ribbon wires, gratings, joint plates, or busbars.

In some embodiments, a method is described for manufacturing a film capacitor (300) described above, wherein, in the case of the film capacitor, capacitor material is removed in order to produce a passage (340, 340a, 340b). In some embodiments, the step for producing the passage (340, 340a, 340b) comprises drilling using a cutting drill. In some embodiments, an advancement of the cutting drill during the drilling procedure is performed in a continuous or oscillating manner.

What is claimed is:

1. A film capacitor for power electronics, comprising:
a first electrically conductive layer, which is arranged on a first end side face of the film capacitor, the surface normal of the first electrically conductive layer being perpendicular to the surface normals of dielectric films of the film capacitor;
a second electrically conductive layer, which is arranged on a second end side face opposite from the first end side face, wherein the surface normal of the second electrically conductive layer is perpendicular to the surface normals of the dielectric films of the film capacitor, wherein the film capacitor comprises at least one inner passage, which extends from the first electrically conductive layer to the second electrically conductive layer, wherein the passage is formed by removal of capacitor material; and
an electrically conductive connection guided from the first electrically conductive layer on the first end side face of the film capacitor, through the inner passage, to the second end side face of the film capacitor, and
wherein the film capacitor is a flat-wound or stacked capacitor.

2. The film capacitor of claim 1 wherein the passage is a drilled hole.

3. The film capacitor of claim 2, wherein the dielectric films of the film capacitor comprise plastic films consisting of polyester (PET), polyethylene naphthalate (PEN), polyphenylene sulfide (PPS), polypropylene (PP), polytetrafluoroethylene (PTFE), polystyrene (PS), or polycarbonate (PC), and wherein the dielectric films are fully or partially metallized or not metallized.

4. The film capacitor of claim 1, wherein the dielectric films of the film capacitor comprise plastic films consisting of polyester (PET), polyethylene naphthalate (PEN), polyphenylene sulfide (PPS), polypropylene (PP), polytetrafluoroethylene (PTFE), polystyrene (PS), or polycarbonate (PC), and wherein the dielectric films are fully or partially metallized or not metallized.

5. A capacitor assembly, comprising:
a film capacitor comprising:
a first electrically conductive layer, which is arranged on a first end side face of the film capacitor, the surface normal of the first electrically conductive layer being perpendicular to the surface normals of dielectric films of the film capacitor, and
a second electrically conductive layer, which is arranged on a second end side face opposite from the first end side face, wherein the surface normal of the second electrically conductive layer is perpendicular to the surface normals of the dielectric films of the film capacitor,
wherein the film capacitor comprises at least one inner passage, which extends from the first electrically conductive layer to the second electrically conductive layer, wherein the passage is formed by removal of capacitor material; and
an electrically conductive connection guided from the first electrically conductive layer on the first end side face of the film capacitor, through the passage, to the second end side face of the film capacitor.

6. The capacitor assembly of claim 5, further comprising:
a first connection element located on the second end side face and connected to the first electrically conductive layer of the film capacitor via the electrically conductive connection,
a second connection element located on the second end side face and connected to the second electrically conductive layer,
wherein the first and the second connection elements are arranged so as to be electrically isolated from one another on the second end side face of the film capacitor.

7. The capacitor assembly of claim 6, wherein the first and the second connection elements are either side-by-side or one above another.

8. The capacitor assembly of claim 6, wherein the first and second are designed as conductors, wires, ribbon wires, gratings, joint plates, or busbars.

9. A capacitor assembly, comprising:
a plurality of film capacitors, wherein each respective film capacitor of the plurality of film capacitors comprises:
a respective first electrically conductive layer, which is arranged on a respective first end side face of the respective film capacitor, the surface normal of the respective first electrically conductive layer being perpendicular to the surface normals of respective dielectric films of the respective film capacitor;
a respective second electrically conductive layer, which is arranged on a respective second end side face opposite from the respective first end side face, wherein the surface normal of the respective second electrically conductive layer is perpendicular to the surface normals of the respective dielectric films of the respective film capacitor;
at least one respective inner passage, which extends from the respective first electrically conductive layer to the respective second electrically conductive layer, wherein the respective passage is formed by removal of respective capacitor material; and
a respective electrically conductive connection guided from the respective first electrically conductive layer on the respective first end side face of the respective film capacitor, through the respective passage, to the respective second end side face of the respective film capacitor;
wherein the plurality of film capacitors are contacted with one another in series or in parallel by means of a plurality of respective connection elements, wherein the plurality of connection elements are arranged so as to be electrically isolated from one another on the second end side faces of the plurality of film capacitors, wherein the plurality of connection elements are electrically connected to respective ones of the first electrically conductive layers on the first end side faces of the plurality of film capacitors.

10. The capacitor assembly of claim 9,
wherein the film capacitors of the plurality of film capacitors are arranged side-by-side,
wherein adjacent ones of the plurality of film capacitors are configured in the capacitor assembly to have respective connection elements with opposite polarity.

11. The capacitor assembly of claim 10,
wherein the film capacitors of the plurality of film capacitors are connected in series by means of a second connection element.

12. The capacitor assembly of claim 9,
wherein film capacitors of the plurality of film capacitors are connected in series by means of a second connection element.

13. The capacitor assembly of claim 9, wherein the plurality of connection elements are designed as conductors, wires, ribbon wires, gratings, joint plates, or busbars.

14. A capacitor assembly, comprising:
a first subassembly comprising:
- at least one first film capacitor comprising a first electrically conductive layer, which is arranged on a first end side face of the film capacitor, wherein the surface normal of the first electrically conductive layer is perpendicular to the surface normals of films of the first film capacitor, and a second electrically conductive layer, which is arranged on a second end side face of the first film capacitor, opposite the first end side face, in parallel with the first electrically conductive layer,
- a first connection element which contacts the first electrically conductive layer of the at least one first film capacitor of the first subassembly;

a second subassembly which is arranged over the first subassembly and comprises:
- at least one second film capacitor comprising a third electrically conductive layer, which is arranged on a third end side face of the second film capacitor, wherein the surface normal of the third electrically conductive layer is perpendicular to the surface normals of films of the second film capacitor, and a fourth electrically conductive layer, which is arranged on a fourth end side face of the second film capacitor, opposite the third end side face of the second film capacitor, in parallel with the third electrically conductive layer,
- a second connection element which contacts the fourth electrically conductive layer of the at least one second film capacitor of the second subassembly;

wherein the first connection element contacts the third electrically conductive layer of the at least one second film capacitor of the second subassembly by means of at least one first connecting line,
wherein the second connection element contacts the second electrically conductive layer of the at least one first film capacitor of the first subassembly by means of at least one second connecting line,
wherein the at least one first film capacitor comprises at least one first inner passage which extends from the first electrically conductive layer to the second electrically conductive layer,
wherein the at least one second film capacitor comprises at least one second inner passage which extends from the third electrically conductive layer to the fourth electrically conductive layer; and
wherein the at least one first connecting line extends through the at least one second inner passage, and
wherein the at least one second connecting line extends through the at least one first inner passage.

15. The capacitor assembly of claim 14,
wherein the first connection element and/or the second connection element is arranged at least in part between the first subassembly and the second subassembly.

16. The capacitor assembly of claim 14,
wherein the first connection element comprises recesses for conducting through the at least one second connecting line, and
wherein the second connection element comprises recesses for conducting through the at least one first connecting line.

17. A capacitor assembly, comprising:
a first subassembly comprising:
- at least one first film capacitor comprising a first electrically conductive layer, which is arranged on a first end side face of the film capacitor, wherein the surface normal of the first electrically conductive layer is perpendicular to the surface normals of films of the first film capacitor, and a second electrically conductive layer, which is arranged on a second end side face of the first film capacitor, opposite the first end side face, in parallel with the first electrically conductive layer,
- a first connection element which contacts the first electrically conductive layer of the at least one first film capacitor of the first subassembly;

a second subassembly which is arranged over the first subassembly and comprises:
- at least one second film capacitor comprising a third electrically conductive layer, which is arranged on a third end side face of the second film capacitor, wherein the surface normal of the third electrically conductive layer is perpendicular to the surface normals of films of the second film capacitor, and a fourth electrically conductive layer, which is arranged on a fourth end side face of the second film capacitor, opposite the third end side face of the second film capacitor, in parallel with the third electrically conductive layer,
- a second connection element which contacts the fourth electrically conductive layer of the at least one second film capacitor of the second subassembly;

a third connection element comprising:
- at least one first connecting line and at least one second connecting line,
wherein the at least one first connecting line of the third connection element contacts the respective second electrically conductive layer of the at least one film capacitor of the first subassembly, and
wherein the at least one second connecting line of the third connection element contacts the respective third electrically conductive layer of the at least one second film capacitor of the second subassembly,
wherein the at least one first film capacitor comprises at least one first inner passage which extends from the first electrically conductive layer to the second electrically conductive layer;
wherein the at least one second film capacitor comprises at least one second inner passage which extends from the third electrically conductive layer to the fourth electrically conductive layer; and
wherein the at least one first connecting line extends through the at least one first inner passage, and
wherein the at least one second connecting line extends through the at least one second inner passage.

18. The capacitor assembly of claim 17, wherein one or more of the first, second and third connection elements are arranged at least in part between the first subassembly and the second subassembly.

19. The capacitor assembly of claim 17, wherein the first connection element comprises recesses for conducting through the at least one first connection line, and the second connection element comprises recesses for conducting through the at least one second connecting line.

20. The capacitor assembly of claim 17, wherein the first, second and third connection elements are designed as conductors, wires, ribbon wires, gratings, joint plates, or busbars.

* * * * *